US006347298B2

(12) United States Patent
Vitale et al.

(10) Patent No.: US 6,347,298 B2
(45) **Date of Patent: *Feb. 12, 2002**

(54) COMPUTER APPARATUS FOR TEXT-TO-SPEECH SYNTHESIZER DICTIONARY REDUCTION

(75) Inventors: Anthony J. Vitale; Ginger Chun-Che Lin, both of Northboro; Thomas Kopec, Amherst, all of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/795,070

(22) Filed: Feb. 26, 2001

Related U.S. Application Data

(63) Continuation of application No. 09/212,874, filed on Dec. 16, 1998, now Pat. No. 6,208,968.

(51) Int. Cl.[7] ................................................ G01L 13/00
(52) U.S. Cl. .......................... 704/260; 704/261; 704/10
(58) Field of Search ................................ 704/201, 235, 704/239, 243, 244, 245, 260, 261, 10

(56) References Cited

U.S. PATENT DOCUMENTS 4,775,956 A 10/1988 Kaji et al.
4,979,216 A 12/1990 Malsheen et al. ............. 381/52
5,157,759 A 10/1992 Bachenko ...................... 395/2
5,323,316 A 6/1994 Kadashevich et al. ......... 704/9
5,384,893 A 1/1995 Hutchins ................... 395/2.76
5,490,061 A 2/1996 Tolin et al. .................... 704/2
5,651,095 A 7/1997 Ogden ........................ 704/260
5,668,928 A 9/1997 Groner ....................... 704/243
5,671,426 A 9/1997 Armstrong, III ............. 704/10
5,751,906 A 5/1998 Silverman ................... 704/260
5,754,977 A 5/1998 Gardner et al. ............. 704/243
5,845,246 A 12/1998 Schalk ....................... 704/243
5,913,194 A 6/1999 Karaali et al. .............. 704/259
5,930,756 A 7/1999 Mackie et al. .............. 704/260
6,208,968 B1 * 3/2001 Vitale et al. ................ 704/260

OTHER PUBLICATIONS

Bachenko, J., et al., "A Parser for Real–Time Speech Synthesis of Conversational Texts," Third Conference on Applied Natural Language Processing, Proceedings of the Conference, pp. 25–32 (1992).

(List continued on next page.)

*Primary Examiner*—Tālivaldis Ivars Šmits
*Assistant Examiner*—Abul K. Azad
(74) *Attorney, Agent, or Firm*—Hamilton, Brook, Smith & Reynolds, P.C.

(57) ABSTRACT

A computerized apparatus for reducing the size of a dictionary used in a text-to-speech synthesis system are provided. In an initial phase, the method and apparatus determine if entries in the dictionary, each containing a grapheme string and a corresponding phoneme string, can be fully matched by using at least one rule set used to synthesize words to phonemic data. If the entry can be fully matched using rule processing alone, the entry is indicated to be deleted from the dictionary. In a second phase, the method and apparatus determine if the entry, considered as a root word entry, is required in the dictionary in order to support phoneme synthesis of other entries containing the root word entry, and if so, the root word entry is indicated to be saved in the dictionary. If the other entries containing the root word entry can have correct phonemic data generated from a combination of the root word entries phonemic data and phonemes generated from rule set processing, then the other entries are indicated to be deleted from the dictionary. After all words have been processed by phase one and/or phase two, the entries indicated to be saved are aggregated to form a reduced dictionary.

35 Claims, 4 Drawing Sheets

OTHER PUBLICATIONS

McGlashan, S., et al., "Dialogue Management for Telephone Information Systems," Third Conference on Applied Natural Language Processing, Proceedings of the Conference, pp. 245–246 (1992).

Zimmerman, J., "Giving Feeling to Speech," *Byte*, 17(4) :168 (1992).

Carlson, R., et al., "Predicting Name Pronunciation for a Reverse Directory Service," *Eurospeech 89*. European Conference on Speech Communication and Technology, pp. 113–115 (1989).

Medina, D., "Humanizing Synthetic Speech," *Information Week*, p. 46 (Mar. 18, 1991).

Lazzaro, J.J., "Even as We Speak," *Byte*, p. 165 (Apr. 1992).

Wolf, H.E., et al., "Text–Sprache–Umsetzung für Anwendungen bei automatischen Informations– und Transaktions–systemen (Text–to–Speech Conversion for Automatic Information Services and Order Systems)," *Informationstechnik it*, vol. 31, No. 5, pp. 334–341 (1989).

Bachenko, J., et al., "Prosodic Phrasing for Speech Synthesis of Written Telecommunications by the Deaf," IEEE Global Telecommunications Conference; *GLOBECOM '91*, 2:1391–5 (1991).

Fitzpatrick, E., et al., "Parsing for Prosody: What a Text–to–Speech System Needs from Syntax," Proceedings of the Annual AI Systems in Government Conference, p. 188–94 (1989).

Yiourgalis, N., et al., "Text to Speech System for Greek," 1991 conference on Acoustics, Speech and Signal Processing, 1:525–8 (1991).

Takahashi, J., et al., "Interactive Voice Technology Development for Telecommunications Applications," *Speech Communication*, 17:287–301 (1995).

* cited by examiner

COMPUTER APPARATUS FOR TEXT-TO-SPEECH SYNTHESIZER DICTIONARY REDUCTION

RELATED APPLICATIONS

This application is a Continuation of application Ser. No. 09/212,874, filed Dec. 16, 1998 U.S. Pat. No. 6,208,968. The entire teachings of the above applications are incorporated herein by reference.

The below described work is related to the subject matter disclosed in the following patent and patent application of the same assignee as the present invention, the contents of which are incorporated herein by reference:

Title: COMPUTER METHOD AND APPARATUS FOR TRANSLATING TEXT TO SOUND

Inventors: Thomas Kopec and Ginger Chun-Che Lin U.S. Pat. No. 6,076,060 Issued Jun. 13, 2000

Title: COMPUTER METHOD AND APPARATUS FOR GRAPHEME TO PHONEME RULE-SET GENERATION Inventors: Anthony J. Vitale, Ginger Chun-Che Lin and Thomas Kopec Ser. No.: 09/179,153 Filed Oct. 16, 1998

BACKGROUND OF THE INVENTION

Generally speaking, a "speech synthesizer" is a computer device or system for generating audible speech from written text. That is, a written form of a string or sequence of characters (e.g., a sentence) is provided as input, and the speech synthesizer generates the spoken equivalent or audible characterization of the input. The generated speech output is not merely a literal reading of each input character, but a language dependent, in-context verbalization of the input. If the input was the phone number (508) 691-1234 given in response to a prior question of "What is your phone number?", the speech synthesizer does not produce the reading "parenthesis, five hundred eight, close parenthesis, six hundred ninety-one . . . . " Instead, the speech synthesizer recognizes the context and supporting punctuation and produces the spoken equivalent "five (pause) zero (pause) eight (pause) six . . . " just as an English-speaking person normally pronounces a phone number.

Historically the first speech synthesizers were formed of a dictionary, engine and digital vocalizer. The dictionary served as a look-up table. That is, the dictionary cross referenced the text or visual form of a character string (e.g., word or other unit) and the phonetic pronunciation of the character string/word. In linguistic terms the visual form of a character string unit (e.g., word) is called a "grapheme" and the corresponding phonetic pronunciation is termed a "phoneme". The phonetic pronunciation or phoneme of character string units is indicated by symbols from a predetermined set of phonetic symbols.

The engine is the working or processing member that searches the dictionary for a character string unit (or combination thereof) matching the input text. In basic terms, the engine performs pattern matching between the sequence of characters in the input text and the sequence of characters in "words" (character string units) listed in the dictionary. Upon finding a match, the engine obtains from the dictionary entry (or combination of entries) of the matching word (or combination of words), the corresponding phoneme or combination of phonemes. To that end, the purpose of the engine is thought of as translating a grapheme (input text) to a corresponding phoneme (the corresponding symbols indicating pronunciation of the input text).

Typically the engine employs a binary search through the dictionary for the input text. The dictionary is loaded into the computer processor physical memory space (RAM) along with the speech synthesizer program. The memory footprint, i.e., the physical memory space in RAM needed while running the speech synthesizer program, thus must be large enough to hold the dictionary. Where the dictionary portion of today's speech synthesizers continue to grow in size, the memory footprint is problematic due to the limited available memory (RAM and ROM) in some/most applications.

The digital vocalizer receives the phoneme data generated by the engine. Based on the phoneme data together with timing and stress data, the digital vocalizer generates sound signals for "reading" or "speaking" the input text. Typically, the digital vocalizer employs a sound and speaker system for producing the audible characterization of the input text.

To improve on memory requirements of speech synthesizers, another design was developed. In that design, the dictionary is replaced by a rule set. Alternatively, the rule set is used in combination with the dictionary instead of completely substituting therefor. At any rate, the rule set is a group of statements in the form IF (condition)-then-(phonemic result) Each such statement determines the phoneme for a grapheme that matches the IF condition. Examples of rule-based speech synthesizers are DECTALK by Digital Equipment Corporation of Maynard, Mass. and TrueVoice by Centigram Communications of San Jose, Calif. Though the use of rule sets reduces the number of entries required in a dictionary for a speech synthesizer system, the dictionaries remain relatively large in size (i.e., number of entries) compared to other parts of the system requiring memory. This is problematic because dictionaries must be completely stored in memory during the speech synthesis process to ensure fast and efficient look-up of entries if needed.

These and other problems exist in speech synthesizer technology. New solutions have been attempted but with little success. As a result, highly accurate and/or memory space efficient speech synthesizers are yet to come.

SUMMARY OF THE INVENTION

Dictionaries used by text-to-speech synthesis systems may grow to become quite large. Dictionary size depends on how many words or word portions in a particular language are determined to be too complex, too difficult or too time consuming to translate into phonemes by rule set processing alone. Such words or word portions are candidates to be included as entries in the dictionary. However, certain problems are encountered when large dictionaries are used in text-to-speech synthesis systems as mentioned above.

The invention recognizes the problems with prior art text-to-speech synthesis systems that use dictionaries and provides an apparatus to reduce the overall size of the dictionaries used in such systems. Specifically, the invention uses a two phase dictionary reduction process to eliminate entries that are not required in the dictionary. In phase one, any entries in the dictionary with respective phonemes that can be fully generated by rules in a rule set are marked or indicated to be deleted from the dictionary. In phase two, any entries in the dictionary, called root word entries, that can provide phonemes for the text-to-speech translation process of larger (longer) entries are marked or indicated to be saved in the dictionary, and the entries of longer character strings that can be translated using the shorter root word entries in conjunction with rules are indicated to be deleted from the dictionary. After phase one and/or phase two are complete, the invention aggregates the entries marked to be saved or removes the entries marked to be deleted and the resulting set of entries is stored as the reduced dictionary.

Phase one or phase two of the invention each may be performed independently, followed by the aggregation step. Alternatively, phase one may be followed by phase two and then by the aggregation process.

In order for embodiments of phase one to determine if the phoneme of an entry in the dictionary can be fully generated (and hence the dictionary entry can be fully matched) by using the rule set, the invention apparatus generates a rule-based phoneme string for the grapheme string of the subject entry and then determine if the rule-based phoneme string matches the corresponding phoneme string of the entry. If there is a match, the subject entry is indicated to be deleted from the dictionary, thus reducing overall dictionary size. Since rules alone can produce the required phoneme string for the subject entry, the invention recognizes that there is no need for the entry to remain in the dictionary.

Embodiments of phase one may also check if the grapheme string of a dictionary entry is a homograph. If so, the preferred embodiment skips to the next entry in the dictionary for processing. A homograph is a word that can be pronounced two different ways but which has one spelling, such as “abstract”, “wind”, and “record”. Due to multiple pronunciations, homograph dictionary entries are skipped since they may have more than one associated phoneme string. During text-to-speech processing, the correct phoneme string is selected from a homograph dictionary entry based on the context of surrounding language in the text being translated.

Embodiments of phase two determine if dictionary entries, referred to as root word entries, are required in the dictionary. This is accomplished by the invention combining grapheme and phoneme strings of the root word entry from the dictionary with respective grapheme and phoneme portions of an affix rule of an affix rule set of the speech syntheses system. This step of combining forms a grapheme combination and phoneme combination pair. Phase two then determines if the grapheme combination and phoneme combination pair exists as another matching entry in the dictionary, and if so, indicates the root word entry to be saved in the dictionary. The matching entry is thus marked for removal/deletion. Thus, phase two saves root words in the dictionary that can be used to assist in the translation of another longer word (the matching entry) in conjunction with rule-based processing, and removes the matching entries from the dictionary which can be correctly translated with a combination of rule processing and root word phonemes.

To create the grapheme combination and phoneme combination pair, embodiments of phase two select and process each root word entry in the dictionary. Specifically for each root word entry, the invention combines the grapheme string of the root word entry with the grapheme portion of the affix rule to form a grapheme combination, and combines the phoneme string of the root word entry with the phoneme portion of the affix rule to form a phoneme combination. Then phase two determines if the grapheme combination exists as a matching grapheme string in an entry in the dictionary. If so, the invention obtains the corresponding phoneme string as a matching phoneme string for the matching entry. Then, phase two determines if the phoneme combination matches the matching phoneme string, and if so, indicates the root word entry to be saved in the dictionary. Thus, the root words that are saved in the dictionary are root words that can be used in the translation of the other matching entries. Phase two also determines if the matching entry has been indicated to be saved in the dictionary. If not, the invention indicates the matching entry to be deleted from the dictionary. As such, phase two reduces the dictionary size by determining which entries rely on phonemes of root words, and saves the root words and deletes entries that can be matched by the root words and rule processing.

By using either phase one or phase two alone, or phase one followed by phase two, the invention reduces the number of entries in a dictionary. To that end, the invention computer apparatus forms a reduced (i.e., smaller in size) dictionary. The reduced dictionary is adaptable to text-to-speech synthesis applications requiring minimal storage space, entry search time, and dictionary load time.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, are illustrative of certain ways of performing the invention. Others will be readily apparent to those skilled in the art.

DETAILED DESCRIPTION OF PREFERRED EMBODIMENTS

Figure 1:
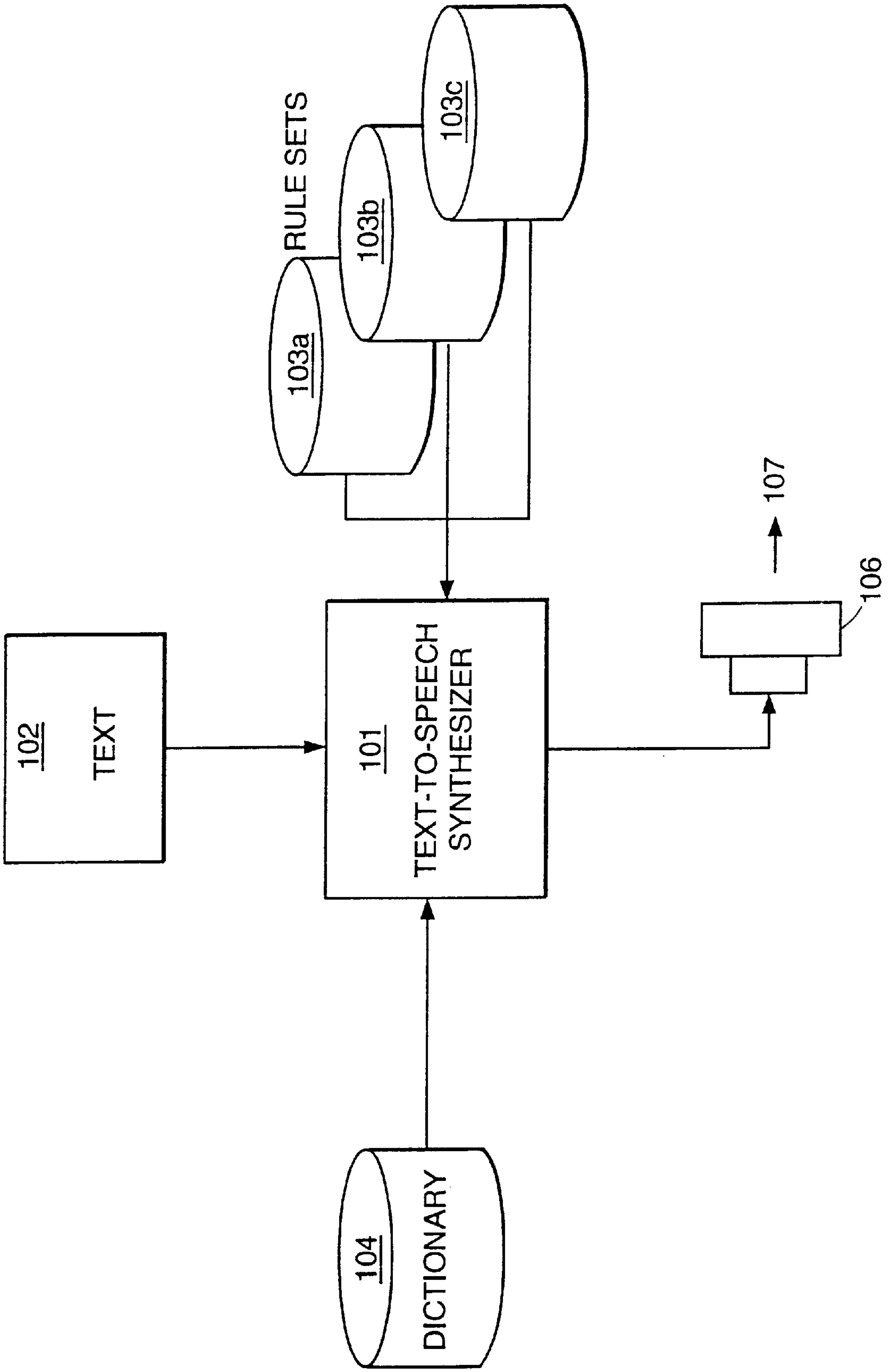
FIG. 1 schematically illustrates the operation of a text-to-speech synthesis system using rule sets and a dictionary to translate words in text to electronically generated speech.

Generally, the present invention provides an apparatus for reducing the size of a dictionary used in a text-to-speech synthesis system. FIG. 1 illustrates the general operation of a typical computerized text-to-speech synthesis system 100 that uses a dictionary 104 that can be reduced in size by this invention. In operation, the text-to-speech synthesizer 101 accepts written text 102 containing words, phrases, names, symbols and so forth as input. Speech synthesizer 101 then employs rule sets 103*a* through 103*c* in conjunction with dictionary 104 to translate the input text 102 into audible electronically generated speech 107. The generated speech is output through a speaker device 106 for example. The present invention is an apparatus for eliminating unnecessary entries in dictionary 104 to reduce its overall size. A dictionary reduced in size by this invention requires less storage space on disk and in memory when used during the text-to-speech translation process performed by text-to-speech synthesizer 101. Also, since there are less entries in dictionary 104 after the reduction process of the present invention, the processing time required to load and to search the dictionary 104 may be reduced as well.

In order to better understand the details of the dictionary reduction processes performed by this invention, a brief explanation of dictionary entries and rule set structure and processing will be presented next. Table 1 below illustrates a small example of entries from a dictionary, such as those that might be found in dictionary 104. The entries in Table 1 are examples and are not limitations on the present invention or speech synthesis system 100.

TABLE 1

EXAMPLE PORTION OF DICTIONARY

| | Grapheme String | Phoneme String |
|---|---|---|
| Dictionary Entry 1 | aardvark | 'ardvark |
| Dictionary Entry 2 | aaron | '@r\|n |
| Dictionary Entry 3 | aback | xb'@k |
| Dictionary Entry 4 | abacus | '@bxkxs |
| Dictionary Entry 5 | abalone | '@bxl'oni |
| Dictionary Entry 6 | abandon | xb'@ndxn |
| Dictionary Entry 7 | abase | xb'es |
| Dictionary Entry 8 | long | l'cG |
| Dictionary Entry 9 | longing | l'cG\|G |
| Dictionary Entry 10 | longingly | l'cG\|Gli |

In Table 1, each dictionary entry 1 through 10 contains (i) a grapheme (i.e., character) string portion (Column 1) comprising one or more graphemes, and (ii) a phoneme string portion (Column 2) comprising one or more phonemes. Generally, a grapheme string corresponds to a word in the dictionary, but the term "word" as used herein does not necessarily mean the formal linguistic unit in the language of the dictionary. Rather, some words in the dictionary can be portions or segments of longer more formally, commonly known words. A single grapheme is any character or symbol in the entire alphabet of the language of the dictionary, such as English. A grapheme may be a letter "A" through "Z" or "a" through "z", numbers such as '0' through '9', or another character or symbol such as "?", "!", "@", and so forth. A grapheme string is one or more graphemes appended together.

A phoneme is one or more character symbols used to represent a single phonetic utterance or sound that may be made when speaking the language of the dictionary. The entire set of phonemes for a language represents all possible utterances that may be combined to pronounce words in that language. A phoneme string is a series of phonemes appended together which represent the phonetic pronunciation of one or more corresponding graphemes (i.e., a grapheme string). As such, a correctly assembled phoneme string represents the phonetic pronunciation for the corresponding grapheme string in a given dictionary entry.

For example, in Table 1, dictionary entry number nine has as a subject grapheme string, the word "longing", and indicates a corresponding phoneme string of "l'cG G". There are sub-strings (i.e., respective graphemes) in the word "longing" that correspond to each phoneme in this phoneme string.

In Table 1,example dictionary entries 1 through 10 resemble dictionary entries of words such as those found in a normal English dictionary. A dictionary that can be reduced by this invention may however contain other information as well, such as word definitions, but this invention is not concerned with this other information. Dictionaries that can be reduced in size by the invention can be created specifically for text-to-speech synthesis systems, or alternatively, the invention may reduce off-the-shelf commercially available dictionaries, such as those supplied on CD-ROM's for other types of application programs besides speech synthesis. The dictionary to be reduced can be for any language, so long as each entry contains a grapheme string and a corresponding phoneme string.

A dictionary not specifically designed for use by a text-to-speech synthesis system is usually very large in size, and contains entries for most words in a language. Dictionaries in the prior art that are designed specifically for text-to-speech synthesis systems are usually larger in size than what is actually needed to perform the text-to-speech synthesis process. The invention is advantageous since it reduces both these and various other types of dictionaries.

As noted previously, large dictionaries are difficult to store entirely in memory during text-to-speech processing, since they can be many megabytes in size. Also, performing text-to-speech translations by looking up each word in a large dictionary is slow compared to rule-based translation processing, which will be discussed shortly. Since text-to-speech synthesis is typically a real-time process, extremely fast processors and large amounts of memory would be needed to perform translations using a dictionary alone.

Accordingly, rule sets (such as 103*a, b*, and *c* in FIG. 1) are frequently used in text-to-speech synthesis systems 100 to quickly translate graphemes of words into phonemes which may then be converted to audible sounds 107. Grapheme-to-phoneme rules, contained in rule sets 103, provide a concise way to analyze a character string in the language and produce the required phonemic data for sound synthesis. Furthermore, rules in a rule set 103 may be generic in that they may convert character strings that are generally not considered to be words worthy of existing in the dictionary 104.

Each rule set 103*a* through 103*c* contains a number of rules in the form:

IF (condition) -then- (phonemic result). Each rule determines the proper corresponding phoneme(s) for a grapheme string that matches the IF condition. The previously noted rule-based text-to-speech synthesizer called DECtalk from Digital Equipment Corporation of Maynard, Mass. uses rule sets 103 in combination with a dictionary 104 to translate text to speech.

During rule processing, each rule of the rule set 103 is considered with respect to the input text 102. Rule-based processing typically proceeds one word or unit of text at a time from the beginning to the end of the input text. Each word or input text unit is then processed by selecting a number of graphemes (i.e. characters) from either the beginning, middle, or end of the input text 102. The graphemes selected depend upon the rule set being used. If a rule condition ("IF-Condition," part of the rule) matches any portion of the input text 102, then the text-to-speech synthesizer 101 determines that the rule applies. As such, the synthesizer stores the corresponding phoneme data (i.e., the phonemic result) from the rule in a working buffer. The synthesizer 101 similarly processes each succeeding rule in the rule set 103 against the remaining input text 102 (i.e., remainder parts thereof) for which phoneme data is needed. After processing all of the text 102 via rules in the rule sets 103, the working buffer holds the phoneme data corresponding to the text which may then be converted to audible speech. For more complete details on the translation of text to sound via rule processing, see co-pending patent application Ser. No. 09/071,441, filed May 1, 1998, entitled "Computer Method and Apparatus for Translating Text To Sound", which is assigned to the assignee of the present application and which is incorporated herein by reference in its entirety.

Table 2 below illustrates ten example rules from a specific type of rule set, called a suffix rule set (e.g. 103*c* in FIG. 1) used for English text strings.

TABLE 2

<table>
<tr><th colspan="3">EXAMPLE PORTION OF A SUFFIX RULE SET</th></tr>
<tr><th></th><th>Grapheme Portion</th><th>Phonemic Data (Phoneme Portion)</th></tr>
<tr><td>Rule 1</td><td>-able</td><td>xbl</td></tr>
<tr><td>Rule 2</td><td>-ing</td><td>x|G</td></tr>
<tr><td>Rule 3</td><td>-less</td><td>l|s</td></tr>
<tr><td>Rule 4</td><td>-ment</td><td>mxnt</td></tr>
<tr><td>Rule 5</td><td>-ness</td><td>n|s</td></tr>
<tr><td>Rule 6</td><td>-ship</td><td>S|p</td></tr>
<tr><td>Rule 7</td><td>-dom</td><td>dxm</td></tr>
<tr><td>Rule 8</td><td>-ers</td><td>Rz</td></tr>
<tr><td>Rule 9</td><td>-ful</td><td>fL</td></tr>
<tr><td>Rule 10</td><td>-ify</td><td>|fA</td></tr>
</table>

Text-to-speech synthesis systems 100, such as that shown in FIG. 1, may use multiple rule sets to obtain phonemic data (i.e., phonemes) for different parts of a given input text/character string 102 (e.g. individual words). There may be rule sets for matching (i) suffixes, which are one or more graphemes obtained from the end of a character string, (ii) prefixes, which are one or more graphemes selected from the beginning of a character string, and (iii) infixes, which are one or more graphemes selected from somewhere in the middle of the subject text string, between the beginning and the end. Suffix and prefix rule sets are called "Affix" rule sets, since they match grapheme portions (i.e., strings) obtained starting from either the beginning or end of a word. In FIG. 1, rule set 103-*a* corresponds to a prefix rule set, rule set 103-*b* corresponds to an infix rule set, and rule set 103-*c* corresponds to a suffix rule set, for example.

The example suffix rules in Table 2 map a respective suffix-like (ending) grapheme portion to corresponding phonemic data or phoneme portion (i.e., one or more phonemes). For example, Rule 9 is used to convert an ending text string (i.e., the suffix grapheme string) "ful" to the phoneme string "fL". The suffix rules shown in Table 2 are given for example only. A full suffix rule set may contain many more entries than those shown in Table 2. While not illustrated in a table, rules in a prefix rule set are similar in nature to the rules in the suffix rule set above, but match prefix grapheme portions of character strings to prefix phonemic data. Likewise, an infix rule set contains rules for matching infix grapheme portions, obtained from the middle of text strings, to phonemic data as well.

Interestingly, rule sets themselves may be generated by an analysis of dictionary entries containing a grapheme string and corresponding phoneme strings. A rule set generation process is described as a separate invention in co-pending U.S. patent application Ser. No. (Unknown) filed October 26, 1998, entitled "Automatic Grapheme-to-Phoneme Rule-Set Generation", which is assigned to the assignee of this invention and is hereby incorporated by reference in its entirety. Typically, a dictionary having many entries, which has not yet been reduced by the teachings of this invention, is used for rule set generation in the referenced application. After the rule sets have been generated from an analysis of the dictionary, the dictionary may then be reduced by phase one and/or phase two of the present invention.

Figure 2:
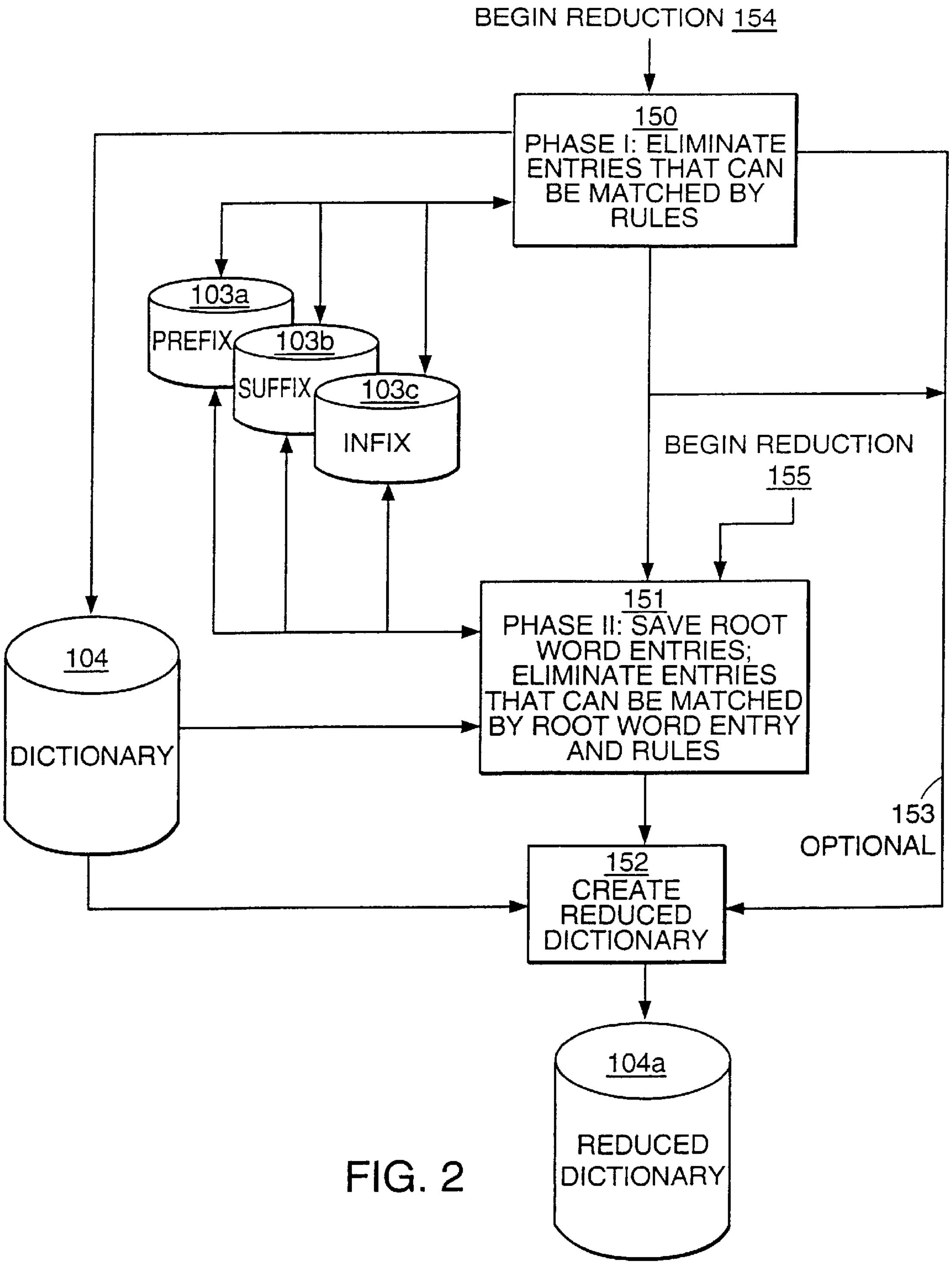
FIG. 2 is a flow diagram illustrating the two phases of the dictionary reduction process of the invention.

FIG. 2 illustrates the two phases used in the present invention to reduce the size of a dictionary 104 in a text-to-speech synthesis system 100. Phase one includes step 150 of the reduction process shown in FIG. 2, and may be performed independently of phase two which is represented by step 151. Accordingly, the reduction process of the invention may begin at either of the "Begin Reduction" indicators 154 or 155 in FIG. 2.

Phase one (Step 150) of the invention is based on the observation that an unreduced dictionary 104 may be reduced in size by eliminating (i.e., deleting or removing) any entries in the dictionary 104 that can be fully matched by the rules in rule sets 103*a–c* in conjunction with rule set processing. During text-to-speech synthesis processing, entries in the dictionary 104 that occur in input text 102, and that may be matched entirely by rules, need not remain in the dictionary 104. As such, phase one (Step 150) determines for each entry in the dictionary 104, if the entry can be fully matched (i.e. can have corresponding phonemes generated) by using the rules of the rule sets 103*a–c*, and if so, marks or indicates those entries to be deleted from the dictionary 104.That is, phase one of the dictionary reduction process marks for elimination any entries in the dictionary 104 that can be properly matched or translated to phonemes by the rule set 103.

After phase one is complete, phase two (Step 151) is typically performed next. However, processing may alternatively bypass phase two (Step 151) by following optional processing path 153 to step 152, where the reduced dictionary 104-*a* is created.

Phase two (step 151) is based on the observation that some entries in the dictionary 104, called root word entries, may provide phonemic data for the text-to-speech translation process of longer words/text strings. As such, these root word entries should not be removed from the dictionary 104 to reduce its size, since the synthesis of longer words in text 102 that contain the root words (i.e., are dependent on these root word entries) can be performed using the root word entries. Furthermore, if longer word entries in dictionary 104 may be translated to phonemes using root word entries in conjunction with rule processing, then the longer word entries can be removed from the dictionary 104 to even further reduce its size. Step 151 thus determines if a root word entry in the dictionary 104 can be used to support the text-to-speech synthesis of other dictionary entries. If so, then that root word entry is indicated or marked to be saved in dictionary 104. Step 151 also determines, based on that root word entry, if longer word entries (i) have not been previously indicated to be saved in the dictionary 104, and (ii) can be translated via phonemes provided by one or more root word entries and rule processing (i.e., the longer word entries contain the root word and some other characters). If these two conditions are met, then the longer word entry is indicated to be deleted from the dictionary 104.

As noted previously, phase one (Step 150) may be followed by phase two (Step 151. In such cases, phase two can indicate a word to be saved that was previously indicated to be deleted during phase one processing. That is, if phase one determines a word (i.e., subject character string) can be matched by rules alone and thus indicates the corresponding dictionary entry is not needed and should be deleted, phase two may subsequently reverse this decision and indicate that the dictionary entry containing the subject word/character string, which is determined to be a root word of other longer words, should be saved.

After either phase one or phase two or both phase one and two have been completed, step 152 is performed. Step 152 creates a reduced dictionary 104-*a* based on the entries in dictionary 104 that have been indicated to be saved and/or deleted by phase one and/or phase two processing. Step 152 may be performed in a variety of ways, with the objective of creating reduced dictionary 104-*a* which is smaller in size (i.e., memory and storage requirements) than initial dictionary 104. Step 152 aggregates entries from the original unreduced dictionary 104 that have been indicated to be saved, and eliminates entries indicated to be deleted.

Figure 3:
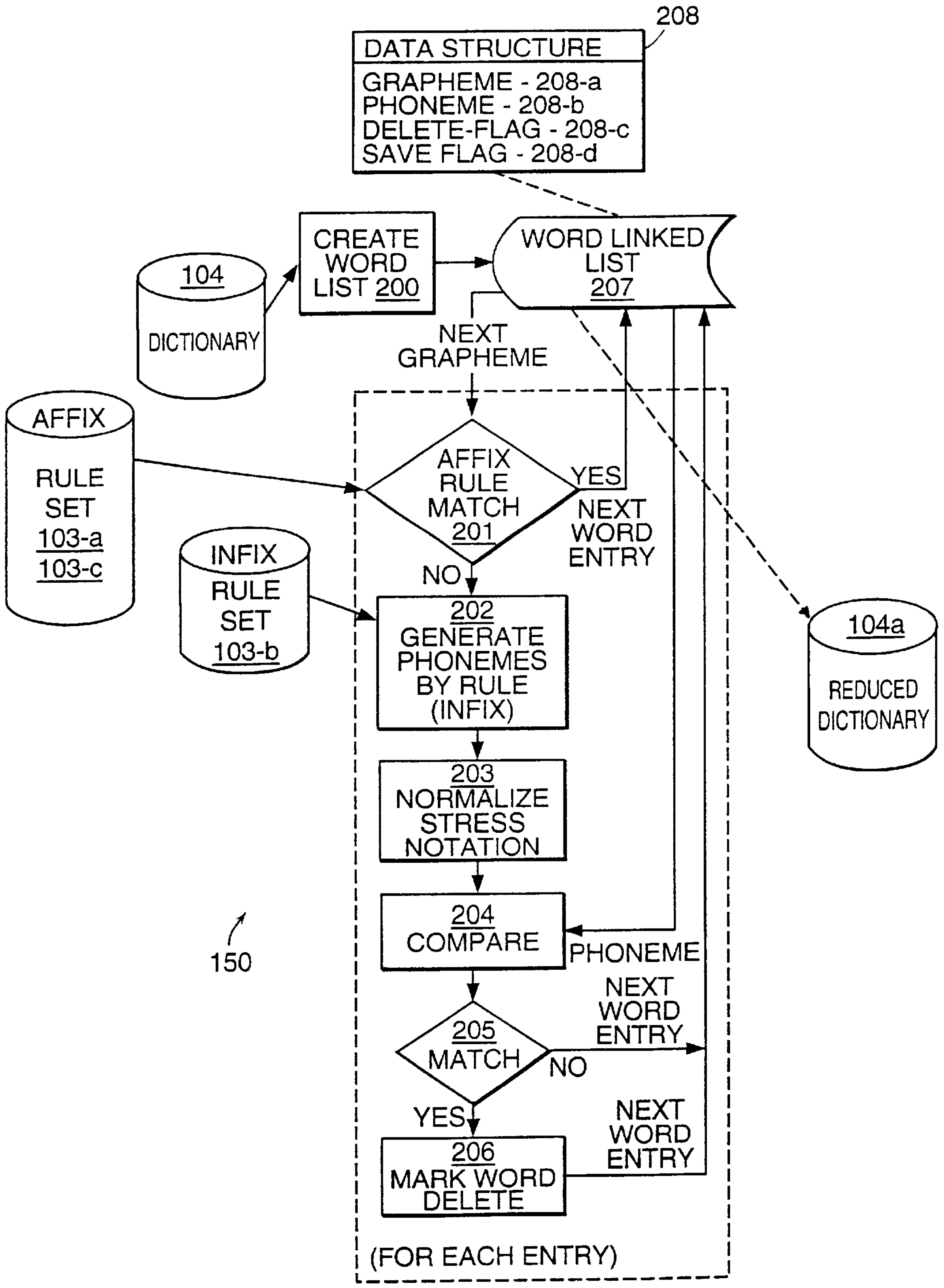
FIG. 3 is a flow chart illustrating the steps involved in phase one of the dictionary reduction process of FIG. 2 according to the invention.

FIG. 3 illustrates the processing steps for a preferred embodiment of phase one (Step 150 in FIG. 2). The processing of FIG. 3 reduces the number of entries in dictionary 104 to produce reduced dictionary 104-*a*. To accomplish this, first, word linked list 207 is created by step 200. The word linked list 207 is a series of data structures 208 that each contain a single entry from dictionary file 104. Each data structure 208 includes (a) an indication of the respective entry grapheme string 208-*a*, (b) an indication of the corresponding phoneme string 208-*b*, (c) a delete flag 208-*c* that may be set or un-set as needed, and (d) a save flag 208-*d* that indicates root words that must be saved. The delete flag 208-*c* and the save flag 208-*d* for each data structure 208 are initially set to false for each word entry. The first data structure 208 in word linked list 207 corresponds to the first entry from dictionary 104, the second data structure 208 in word linked list 207 corresponds to the second dictionary entry, and so forth. From the example dictionary entries in Table 1 above, the entry for "aardvark" and its phonemic data "'ardvark" is stored as the first data structure 208 in the word linked list 207, followed by another data structure 208 for the dictionary entry for "aaron", and so forth. In a preferred embodiment, each entry in dictionary file 104 is read into memory and stored in the word linked list 207 as a separate data structure 208.

Steps 201 through 206 are then performed for each data structure 208 in the word linked list 207. Beginning with the first word linked list data structure 208, step 201 attempts to match any one of the affix rules from affix rule sets 103-*a* and 103-*c* to the grapheme string 208-*a* of the subject data structure 208. For instance, step 201 attempts to match suffix rules to the end, and prefix rules to the beginning of grapheme string 208-*a*. If any affix rule matches, processing skips to the next word linked list data structure 208 to obtain the next grapheme string 208-*a*. Thus, any dictionary 104 entry words (i.e. grapheme string 208-*a* of each data structure 208 that can initially be matched to an affix (prefix or suffix) rule are skipped by phase one. The reason for this is that words having a prefix and/or a suffix are typically complex words which include one or more root words. Words containing root words and a prefix and/or suffix that can be matched with affix rules are dealt with during phase two processing.

If no affix rules match any beginning or ending graphemes in grapheme string 208-*a*, step 202 then uses rules in infix rule file 103 to generate phonemes based on an analysis of the subject grapheme string 208-*a*. That is, step 202 takes the grapheme string (i.e. the dictionary entry character string/word) for the subject data structure 208 currently being processed by steps 201 through 206 and attempts to parse the grapheme string 208-*a* using only grapheme-to-phoneme rules from infix rule set 103-*b*. This parsing process (Step 202 ultimately creates a rule-based phoneme string, just as if the grapheme string were input text being translated for text-to-speech synthesis using infix rules. As noted previously, rule processing is described in detail in the co-pending U.S. patent application, entitled "Computer Method and Apparatus for Translating Text to Sound." As an example of step 202, take the first entry in the dictionary example from Table 1.Assume that no affix rules matched the "aardvark" grapheme string in step 201. In step 202, "aardvark" would be parsed by infix rules in the infix rule set 103-*b* to produce an infix rule-based phoneme string for this word, such as "'ardvark". This resultant rule-based phoneme string may or may not be equivalent to the corresponding phoneme string 208-*b* in the current data structure 208/dictionary 104 entry.

After a rule-based phoneme string is generated via infix rule processing in step 202, step 203 normalizes the stress notation marks in the generated rule-based phoneme string. The exact normalization mechanism depends on the characteristics and structure of the rule sets and the dictionary; in the preferred embodiment, the stress mark for a syllable always precedes a vowel phoneme in the syllable, and the rules may place the stress marks further to the left; thus, the preferred embodiment normalizes stress marks by shifting them to the right until they reach a vowel phoneme. For example, if the rule-based phoneme string for "abase" were "x'bes", the "'" stress mark would be shifted to the right by one character resulting in the phoneme string "xb'es". Stress normalization corrects for different, but equivalent placement of the stress mark relative to the syllable boundaries of the word which can occur due to different dialects of a language.

Next, step 204 compares the normalized rule-based phoneme string (originally in step 202 with the phoneme string portion 208-*b*in the subject data structure 208 for the current dictionary entry in the word linked list 207. The comparison is performed to determine if the rule-based phoneme string produced from the rule processing of step 202 matches the phoneme string portion 208-*b* of the current data structure 208 dictionary entry. A "match"or "no match" decision is performed in step 205. If the two phoneme strings do not match, then the rule-based phoneme string from step 202 is different than the actual phoneme string 208-*b*for the subject data structure 208 entry obtained from the dictionary 104. Accordingly, the entry remains in the dictionary 104 and processing proceeds to step 201 to process the next dictionary entry data structure 208. That is, steps 204 and 205 determine if the rule generated phoneme string for the subject data structure 208 and its corresponding phoneme string 208-*b*from the corresponding dictionary entry are the same or not. If they are not the same, then infix rules alone cannot be used to generate a correct phoneme string for this dictionary entry, and the entry should remain in the dictionary.

However, if step 205 determines that the rule-based phoneme string and the actual phoneme string 208-*b*for the current data structure 208 (i.e., the phoneme string obtained from the corresponding dictionary entry) are the same (i.e., they match each other), then step 206 sets the delete flag 208-*c* in the data structure 208. This indicates that the corresponding dictionary entry is to be deleted. In this instance, the entry need not remain in the dictionary 104, since rule-based processing alone can generate rule-based phonemic data identical or equivalent to that found in the phoneme string portion of the entry in dictionary 104. That is, since the subject grapheme can be correctly converted to phonemes by infix rules, there is no need to maintain the respective entry in the dictionary 104.

After step 205 and/or 206 are complete, processing returns to obtain the next data structure 208 for the next entry in word linked list 207. After all entries have been processed by steps 201 through 206, phase one is complete. Certain data structures 208 in word linked list 207 will have their delete flags 208-*c* set, indicating that the corresponding entries are to be deleted from dictionary 104. At this point, if only phase one of dictionary reduction is to be performed, processing proceeds to step 152 in FIG. 2 via path 153, in order to process the word linked list 207 into a reduced dictionary 104-*a*. Step 152, as noted above, selects those entries not indicated to be deleted for storage in reduced dictionary 104-*a*.

Figure 4:
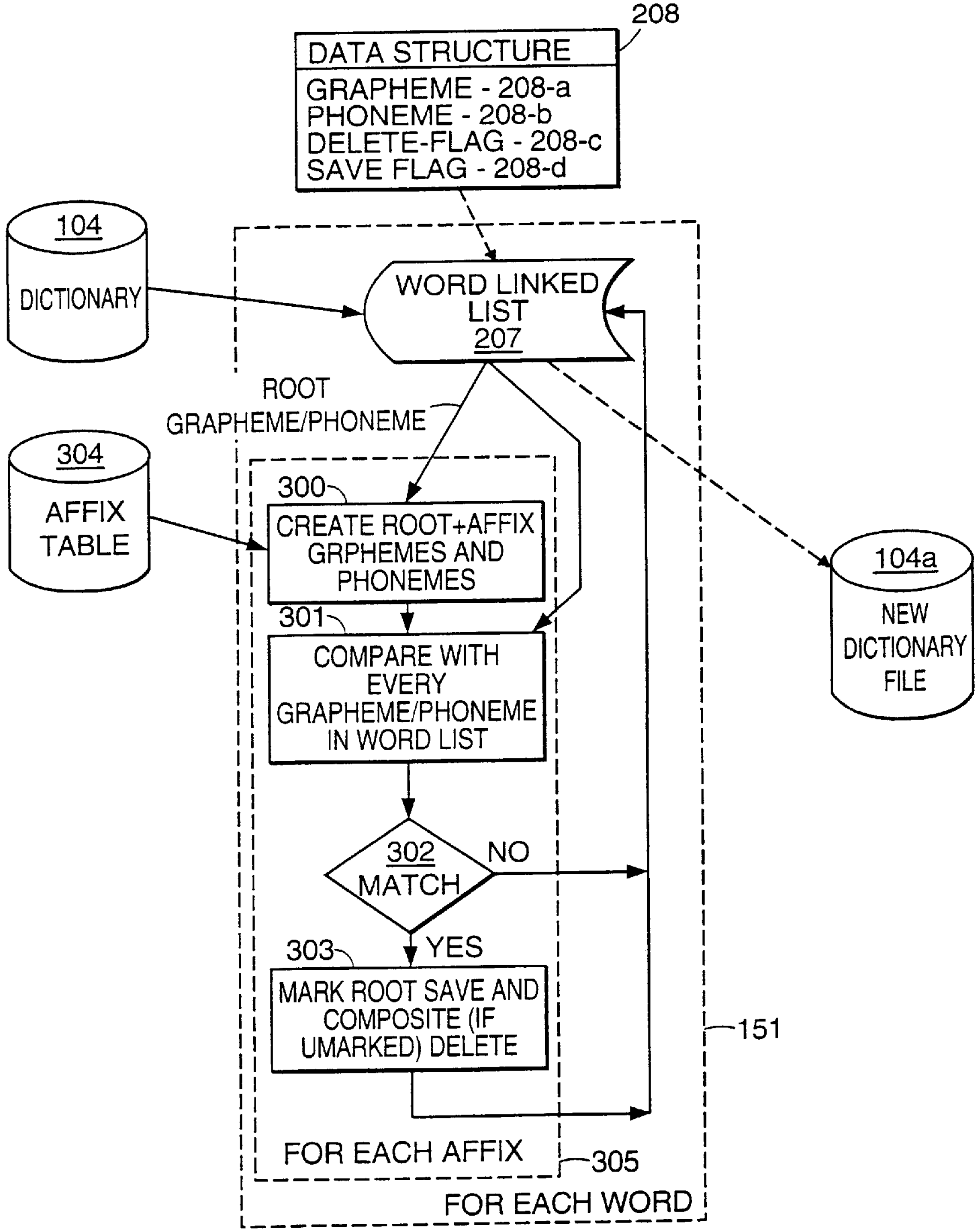
FIG. 4 is a flow chart illustrating the steps involved in phase two of the dictionary reduction process of FIG. 2 according to the invention.

If phase two is performed after phase one, after all entries have been processed by steps 201 through 206 in FIG. 3, processing proceeds to step 300 in FIG. 4 to begin the steps of phase two. If phase two is performed without first performing phase one (150 of FIG. 3) of the dictionary reduction process, processing begins in phase two by creating the same word link list 207 containing the same entries in data structures 208 as described above with respect to step 200 of phase one.

In either case, phase two consists of two nested loops of processing, which are illustrated by the dotted lines labeled 151 and 305 and titled "for each word" and "for each affix", respectively in FIG. 4. The outer loop 151 of phase two processing begins by selecting the first data structure 208 from word linked list 207, and proceeds to step 300. Each data structure 208 in word linked list 207 is processed by steps 300 through 303, and the data structure 208 that is currently being processed is called the root word entry. After each root word entry is selected, steps 300 through 303 are then performed for this root word entry for every affix in affix table 304.

Affix table 304 is a data structure, such as a table or linked list, which has entries that each hold a single grapheme string portion and phonemic data portion for a single respective affix rule from the affix (i.e., prefix and suffix) rule sets 103-*a* and 103-*c*. Just as the word linked list 207 has dictionary entry data structures 208 each containing a grapheme 208-*a* and phoneme 208-*b*pair, each affix table entry corresponds to an affix rule and holds the rule's grapheme string and phoneme string portions. The affix table 304 may be created before phase two processing has started, or step 300 may create the affix table 304 before processing any data structures 208 from word linked list 207. As an example, affix table 304 may appear just as the rule set in Table 2, except that the affix table 304 contains an affix entry for all rules in both the suffix and prefix rule sets 103-*a* and 103-*c* (i.e., the affix rule sets). The affix table 304 is created to provide access to affix rule information in computer memory in order to increase the speed of phase two processing. In an alternative embodiment, step 300 may directly access affix rule sets 103-*a* and 103-*c* instead of the affix table 304, with the same objective. The affix entry that is processed at any point in time is referred to herein as the current affix entry.

The objective of phase two is to determine if the current root word entry 208 can provide proper phonemes 208-*b*for text-to-speech synthesis of a longer dictionary entry that contains the root word entry's grapheme string 208-*a* as part of its grapheme string. To perform this processing, step 300 in FIG. 4 creates combinations of the grapheme and phoneme strings of a root word entry data structure 208 from the word linked list 207 (i.e., the dictionary) with respective grapheme and phoneme portions of affix entries (i.e., rules) from the affix table 304 (i.e., the affix rule sets). More specifically, step 300 appends the grapheme portion from the current affix entry to the respective end or beginning of the grapheme string 208-*a* of the current root word entry being processed to create a grapheme combination. If the current affix entry is a prefix rule, the grapheme portion for this prefix rule is appended to the beginning of the root word entry's grapheme string 208-*a*. If the current affix entry is a suffix rule, the grapheme portion for this suffix rule is appended to the end of the root word entry's grapheme string 208-*a*. Step 300 also appends the phoneme portion from the current affix entry to the end or beginning of the phoneme string portion 208-*b*of the current root word entry data structure 208 being processed, to create a phoneme combination. If the current affix entry is a prefix rule, the phoneme portion for this prefix rule is appended to the beginning of the root word entry's phoneme string 208-*b*. If the current affix entry is a suffix rule, the phoneme portion for this suffix rule is appended to the end of the root word entry's phoneme string 208-*b*. In this manner, step 300 creates a grapheme combination and phoneme combination pair.

As an example of step 300, suppose the current root word entry data structure 208 corresponds to Dictionary Entry 8 from Table 1, which has "long" as its grapheme string 208-*a* and "l'cG" as its phoneme string 208-*b*. Also suppose the current affix entry from affix table 304 corresponds to Suffix Rule 2 in Table 2, which has "ing" as a grapheme portion and "x|G" as a phoneme portion. Since the affix entry is for a suffix rule, step 300 combines the dictionary entry grapheme string "long" (i.e., the root word) and the rule grapheme portion "ing" to create the grapheme combination "longing". Step 300 also combines the dictionary entry's phoneme string 208-*b*"l'cG" with the phoneme portion of the affix entry (i.e. the suffix rule 2) "x|G", to create the phoneme combination "l'cG|G". The grapheme combination and phoneme combination pair thus appears as "longing l'cG|G."

Step 301 then compares this grapheme combination and phoneme combination pair with the grapheme string 208-*a* and phoneme string 208-*b*pair in every other dictionary entry stored in each data structure 208 in word linked list 207. Step 302 then determines if any of the comparisons match each other. If steps 301 and 302 determine that another dictionary entry exists in word linked list 207 that has the same grapheme string 208-*a* and phoneme string 208-*b*, this other dictionary entry's data structure 208 is called a matching word entry. That is, steps 301 and 302 determine if the grapheme combination and phoneme combination pair created in step 300 exists as a dictionary entry elsewhere in the dictionary 104.

If a match occurs in step 302, it has been determined that the combination of graphemes and phonemes from a root word along with graphemes and phonemes from an affix rule can produce the same grapheme and phoneme combination as another matching entry in the dictionary 104. Accordingly, step 303 indicates the current data structure 208 for that root word entry to be saved by setting the save flag 208-*d* to true. Step 303 then sets the delete flag 208-*c* in the matching word entry to true. That is, phase two can determine the a root word entry previously indicated to be deleted by the delete flag 208-*c* should actually be saved in the dictionary 104 by marking the save flag 208-*d* to true. If saved, phase two has, at this point, also determined that the root word entry in the dictionary 104 can be used along with the rules to translate the matching word entry, and thus the matching word entry is not needed in the dictionary 104. Accordingly, step 303 sets the delete flag 208-*c* to true for the matching word entry (i.e., data structure 208 that matched the grapheme combination and phoneme combination pair) to indicate that the matching word entry is to be deleted.

After steps 302 and/or 303, processing returns to step 300 where the next entry in affix table 304 is applied to the current root word data structure 208 via steps 300 through 303. When no more affix table entries are available, the next data structure 208 from word linked list 207 is selected as the current root word entry. When all dictionary entries stored in word linked list 207 have been processed with all of the affix rules in affix table 304, the processing of phase two is complete. Processing then proceeds to step 152 in FIG. 2 (described above) in order to create the reduced dictionary 104-*a* from the word linked list 207. Any data structure 208 in word linked list 207 that is indicated as having a save flag 208-*d* marked true, or a delete flag 208-*c* marked false is saved in the reduced dictionary 104-*a*. Thus, a save flag 208-*d* marked true overrides a delete flag 208-*c* marked true. Therefore, any word entry data structures 208 having a save flag 208-*d* equal to true will be saved in the reduced dictionary, regardless of what delete flag 208-*c* indicates. In this manner, phase two considerably reduces the size of dictionary 104.

In a preferred embodiment of the invention, step 202 in phase one (FIG. 3) only uses infix rule set 103-*b*to generate the rule-based phoneme string from the grapheme string 208-*a* of the current data structure 208/dictionary entry. This is because infix rule set 103-*b*contains a set of rules that match individual graphemes (i.e. letters) to individual phonemes, for the entire alphabet of the language. That is, in infix rule set 103-*b*, there are separate rules for "a", "b", "c", and so forth, which match each of these letters to a corresponding phoneme. By using infix rule set 103-*b*, step 202 is certain to always be able to produce at least one complete rule-based phoneme string from the subject data structure grapheme string 208-*a*, even if step 202 must match graphemes to phonemes letter by letter. In an alternative embodiment, step 202 can use prefix, infix, and suffix rule sets for rule processing to generate a rule-based phoneme string.

While this invention has been particularly shown and described with references to preferred embodiments thereof, it will be understood by those skilled in the art that various changes in form and details may be made therein without departing from the spirit and scope of the invention as defined by the appended claims. For example, rearrangement of certain processing steps in phase one and/or phase two may be accomplished while still obtaining the same beneficial result of the invention. As an example of such a rearrangement, in phase two (FIG. 4), the two processing loops could be reversed. Thus, instead of performing the processing for each word entry, and then for each affix rule on that word entry, processing could be performed for each affix rule, and then for each word entry with that affix rule. When all word entries were processed for a rule, the next affix rule would be selected and processing would repeat beginning again with the first word entry.

Those skilled in the art will recognize or be able to ascertain using no more than routine experimentation, many other equivalents to the specific embodiments of the invention described specifically herein. Such equivalents are intended to be encompassed in the scope of the claims. For example, a logic unit, as contemplated by the present invention, may be implemented as multiple logic sub-units.

What is claimed is:

1. An apparatus for reducing the size of a dictionary used in a speech synthesis system having a set of rules for determining phonemes from graphemes, the dictionary containing a plurality of entries, the apparatus comprising:

a logic unit determining if a given entry in the dictionary can be fully matched by using rules of the rule set, and if so, indicating the entry to be deleted from the dictionary;

the logic unit determining if the given entry is required in the dictionary in order to support other entries, and if so, indicating the given entry to be saved and aggregating the entries indicated as to be saved, to form a reduced dictionary therefrom; and wherein the given entry comprises a grapheme string and a corresponding phoneme string.

2. The apparatus of claim 1 wherein:

the logic unit generates a rule-based phoneme string for the grapheme string of the entry using rules in the rule set and determines if the rule-based phoneme string matches the corresponding phoneme string of the entry, and if so, indicates the entry to be deleted from the dictionary.

3. The apparatus of claim 2 wherein:

the logic unit provides an affix rule set containing affix rules for determining phonemes from beginning and ending graphemes of character strings, each affix rule having a grapheme portion and a corresponding phoneme portion; and the logic unit combining grapheme and phoneme strings of a root word entry from the dictionary with respective grapheme and phoneme portions of an affix rule of the affix rule set to form a grapheme combination and phoneme combination pair and determining if the grapheme combination and phoneme combination pair exists as a matching entry in the dictionary, and if so, indicating the root word entry to be saved in the dictionary, and, indicating the matching entry to be deleted from the dictionary.

4. The apparatus of claim 3, wherein:

the logic unit determines if the grapheme combination and phoneme combination pair exists as a matching entry in the dictionary, respectively for the root entry with each affix rule in the affix rule set and determines if an entry is required, for each root word entry in the dictionary starting with a first root word entry.

5. The apparatus of claim 3 wherein:

the logic unit, before generating a rule based phoneme string, determines if any affix rule from the affix rule set matches a portion of the grapheme string of the entry, and if so, skipping to a next entry in the dictionary for processing.

6. The apparatus of claim 3 wherein:

the logic unit further checks if the grapheme string of the entry is a homograph, and if so, skips to a next entry in the dictionary for processing.

7. The apparatus of claim 3 wherein:

the logic unit combines the grapheme string of the root word entry with the grapheme portion of the affix rule to form the grapheme combination and combining the phoneme string of the root word entry with the phoneme portion of the affix rule to form the phoneme combination.

8. The apparatus of claim 7, wherein:

the logic unit further determines if the grapheme combination exists as a matching grapheme string in an entry in the dictionary, and if so, obtaining the correspond ing phoneme string as a matching phoneme string for the entry and determining if the phoneme combination matches the matching phoneme string, and if so, indicating the root word entry to be saved in the dictionary and indicating the matching entry to be deleted from the dictionary.

9. The apparatus of claim 8 wherein:

the logic unit normalizes any lexical stress in the phoneme combination and the matching phoneme string before determining if the phoneme combination matches the matching phoneme string.

10. An apparatus for reducing the size of a dictionary used in a speech synthesis system, the dictionary containing a plurality of entries, the apparatus comprising:

a logic unit determining if a given entry is required in the dictionary in order to produce the phoneme string of another entry, and if so, indicating the given entry to be saved;

the logic unit creating a dictionary containing entries indicated to be saved;

the logic unit combining grapheme and phoneme strings of a root word entry in the dictionary with respective grapheme and phoneme portions of an affix rule of the affix rule set to form a grapheme combination and phoneme combination pair; and determining if the grapheme combination and phoneme combination pair exists as a matching entry in the dictionary, and if so, indicating the root word entry to be saved in the dictionary and indicating the matching entry to be deleted; and wherein the speech synthesis system includes an affix rule set containing affix rules for determining phonemes from beginning and ending graphemes of character strings, each affix rule having a grapheme portion and a corresponding phoneme portion.

11. The apparatus of claim 10 wherein:

the logic unit determines if the grapheme combination and phoneme combination pair exists as a matching entry in the dictionary, respectively, for the root word entry with each affix rule in the affix rule set.

12. The apparatus of claim 11 wherein the logic unit determines if an entry is required, for each root entry in the dictionary, starting with a first root word entry.

13. The apparatus of claim 12 wherein:

the logic unit further combines the grapheme string of the root word entry with the grapheme portion of the affix rule to form the grapheme combination and combines the phoneme string of the root word entry with the phoneme portion of the affix rule to form the phoneme combination.

14. The apparatus of claim 13 wherein:

the logic unit determines if the grapheme combination exists as a matching grapheme string in an entry in the dictionary, and if so, obtaining the corresponding phoneme string as a matching phoneme string for the entry and determining if the phoneme combination matches the matching phoneme string, and if so, indicating the root word entry to be saved in the dictionary and indicating the matching entry to be deleted in the dictionary.

15. The apparatus of claim 14 wherein:

the logic unit normalizes any lexical stress in the phoneme combination and the matching phoneme string before determining if the phoneme combination matches the matching phoneme string.

16. The apparatus of claim 12 wherein:

the logic unit saves, in a reduced dictionary, the entries that have been indicated to be saved.

17. The apparatus of claim 12 wherein:

the logic unit deletes entries that have been indicated to be deleted from the dictionary.

18. The apparatus of claim 12 wherein the entries in the dictionary are arranged according to length of grapheme string with the shortest grapheme string first.

19. The apparatus of claim 12 wherein:

the logic unit determines if the grapheme combination and phoneme combination pair exists as a matching entry in the dictionary, first with rules from the affix rule set for determining phonemes from beginning graphemes.

20. The apparatus of claim 12 wherein:

the logic unit determines if the grapheme combination exists as a matching grapheme string in an entry in the dictionary, and if so, obtains the corresponding phoneme string as a matching phoneme string for the entry; and the logic unit determines if the phoneme combination matches the matching phoneme string, and if so, indicating the root word entry to be saved in the dictionary and indicating the matching entry to be deleted in the dictionary.

21. The apparatus of claim 20 wherein:

the logic unit normalizes any lexical stress in the phoneme combination and the matching phoneme string before determining if the phoneme combination matches the matching phoneme string.

22. The apparatus of claim 20 wherein:

the logic unit saves, in a reduced dictionary, entries that have been indicated to be saved.

23. An apparatus for reducing the size of a dictionary used in a speech synthesis system having a set of rules for determining phonemes from graphemes, the dictionary containing a plurality of entries, the apparatus comprising:

a logic unit determining, for each entry in the dictionary, if the entry in the dictionary can be fully matched by using rules of the rule set, and if so, indicating the entry to be deleted from the dictionary;

the logic unit creating a reduced dictionary from the entries remaining after omitting any entries indicated as to be deleted; and wherein each entry comprises a grapheme string and a corresponding phoneme string.

24. The apparatus of claim 23 wherein:

the logic unit further generates a rule-based phoneme string for the grapheme string of the entry, using rules in the rule set, and determines if the rule-based phoneme string matches the corresponding phoneme string of the entry, and if so, indicating the entry is to be deleted from the dictionary.

25. The apparatus of claim 24 wherein:

the logic unit further determines, for each entry in the dictionary starting with a first entry, if an entry in the dictionary can be fully matched.

26. The apparatus of claim 25 wherein:

the logic unit provides an affix rule set for the speech synthesis system, the affix rule set for determining phonemes from beginning and ending graphemes of character strings, and before generating a rule based phoneme string, checking if any affix rule from the affix rule set matches a portion of the grapheme string of the entry, and if so, skipping to a next entry in the dictionary for processing.

27. The apparatus of claim 26 wherein:

the logic unit checks if the grapheme string of the entry is a homograph, and if so, skips to a next entry in the dictionary for processing.

28. The apparatus of claim 26 wherein:

the logic unit deletes entries that have been marked as to be deleted from the dictionary.

29. The apparatus of claim 26 wherein:

the logic unit saves, in a reduced dictionary, entries that have not been indicated to be saved.

30. A speech synthesis system for reducing the size of a dictionary containing a plurality of entries, the speech synthesis system having a set of rules for determining phonemes from graphemes, the speech synthesis system comprising:

a dictionary;

a text-to-speech synthesizer connected to the dictionary;

a rule set connected to the text-to-speech synthesizer;

a logic unit, contained in the text-to-speech synthesizer, determining if a given entry in the dictionary can be fully matched by using rules of the rule set, and if so, indicating the entry to be deleted from the dictionary;

the logic unit determining if the given entry is required in the dictionary in order to support other entries, and if so, indicating the given entry to be saved and aggregating the entries indicated as to be saved, to form a reduced dictionary therefrom; and wherein the given entry comprises a grapheme string and a corresponding phoneme string.

31. A speech synthesis system for reducing the size of a dictionary containing a plurality of entries, the speech synthesis system comprising:

a dictionary;

a text-to-speech synthesizer connected to the dictionary;

a rule set connected to the text-to-speech synthesizer;

a logic unit, contained in the text-to-speech synthesizer, determining if a given entry is required in the dictionary in order to produce the phoneme string of another entry, and if so, indicating the given entry to be saved;

the logic unit creating a dictionary containing entries indicated to be saved;

the logic unit combining grapheme and phoneme strings of a root word entry in the dictionary with respective grapheme and phoneme portions of an affix rule of the affix rule set to form a grapheme combination and phoneme combination pair; and determining if the grapheme combination and phoneme combination pair exists as a matching entry in the dictionary, and if so, indicating the root word entry to be saved in the dictionary and indicating the matching entry to be deleted; and wherein the speech synthesis system includes an affix rule set containing affix rules for determining phonemes from beginning and ending graphemes of character strings, each affix rule having a grapheme portion and a corresponding phoneme portion.

32. A speech synthesis system for reducing the size of a dictionary containing a plurality of entries, the speech synthesis system having a set of rules for determining phonemes from graphemes, the speech synthesis system comprising:

a dictionary;

a text-to-speech synthesizer connected to the dictionary;

a rule set connected to the text-to-speech synthesizer;

a logic unit, contained in the text-to-speech synthesizer, determining for each entry in the dictionary, if the entry in the dictionary can be fully matched by using rules of the rule set, and if so, indicating the entry to be deleted from the dictionary;

the logic unit creating a reduced dictionary from the entries remaining after omitting any entries indicated as to be deleted; and wherein each entry comprises a grapheme string and a corresponding phoneme string.

33. A computer program product comprising:

a computer usable medium for reducing the size of a dictionary containing a plurality of entries, the speech synthesis system having a set of rules for determining phonemes from graphemes;

a set of computer program instructions embodied on the computer usable medium, including instructions to:

determine if a given entry in the dictionary can be fully matched by using rules of the rule set, and if so, indicating the entry is to be deleted from the dictionary;

determine if the given entry is required in the dictionary in order to support other entries, and if so, indicating the given entry to be saved;

aggregate the entries indicated as to be saved, to form a reduced dictionary therefrom; and wherein the given entry comprises a grapheme string and a corresponding phoneme string.

34. A computer program product comprising:

a computer usable medium for reducing the size of a dictionary used in a speech synthesis system, the dictionary containing a plurality of entries;

a set of computer program instructions embodied on the computer usable medium, including instructions to:

determine if a given entry is required in the dictionary in order to produce the phoneme string of another entry, and if so, indicating the given entry to be saved;

create a dictionary containing entries indicated to be saved;

combine grapheme and phoneme strings of a root word entry in the dictionary with respective grapheme and phoneme portions of an affix rule of the affix rule set to form a grapheme combination and phoneme combination pair;

determine if the grapheme combination and phoneme combination pair exists as a matching entry in the dictionary, and if so, indicating the root word entry to be saved in the dictionary and indicating the matching entry to be deleted; and wherein the speech synthesis system includes an affix rule set containing affix rules for determining phonemes from beginning and ending graphemes of character strings, each affix rule having a grapheme portion and a corresponding phoneme portion.

35. A computer program product comprising:

a computer usable medium for reducing the size of a dictionary used in a speech synthesis system having a set of rules for determining phonemes from graphemes, the dictionary containing a plurality of entries;

a set of computer program instructions embodied on the computer usable medium, including instructions to:

determine, for each entry in the dictionary, if the entry in the dictionary can be fully matched by using rules of the rule set, and if so, indicating the entry to be deleted from the dictionary;

create a reduced dictionary from the entries remaining after omitting any entries indicated as to be deleted; and wherein each entry comprises a grapheme string and a corresponding phoneme string.

* * * * *